United States Patent [19]
Tsukamoto et al.

[11] Patent Number: 5,775,666
[45] Date of Patent: Jul. 7, 1998

[54] ELASTIC MOUNT HAVING MOUNTING BRACKET FUNCTIONING AS STOP MECHANISM AND METHOD OF PRODUCING THE SAME

[75] Inventors: Hiroshi Tsukamoto, Iwakura; Hiroaki Tanahashi, Aichi-ken, both of Japan

[73] Assignee: Tokai Rubber Industries, Ltd., Japan

[21] Appl. No.: 724,593

[22] Filed: Sep. 30, 1996

[30] Foreign Application Priority Data

Sep. 29, 1995 [JP] Japan ................. 7-252447

[51] Int. Cl.$^6$ .................. F16F 9/00; F16M 1/00
[52] U.S. Cl. .................. 248/634; 248/562; 248/636
[58] Field of Search ................. 248/634, 636, 248/562

[56] References Cited

U.S. PATENT DOCUMENTS

| | | | |
|---|---|---|---|
| 5,005,810 | 4/1991 | Sawada et al. | 248/636 |
| 5,170,998 | 12/1992 | Muramatsu | 248/636 |
| 5,183,243 | 2/1993 | Matsumoto . | |
| 5,217,211 | 6/1993 | Ide et al. | 248/636 |
| 5,246,212 | 9/1993 | Funahashi et al. | 248/636 |

FOREIGN PATENT DOCUMENTS

4-39446  4/1992  Japan .

Primary Examiner—Victor N. Sakran
Attorney, Agent, or Firm—Parkhurst & Wendel, L.L.P

[57] ABSTRACT

An elastic mount wherein a first and a second support member are spaced apart from each other and elastically connected to each other by an elastic body, wherein the second support member has a cylindrical fixing portion having a larger diameter than the first support member, and a cylindrical bracket member is press-fitted on the fixing portion of the second support member such that the cylindrical bracket member encloses the first support member. The bracket member includes an axial end portion provided with an integrally formed abutting part opposed to the first support member in an axial direction of the bracket member. A buffer member interposed between the first support member and the abutting part cooperates with the first support member and the abutting part to constitute a first stop mechanism for limiting an amount of relative displacement of the first and second support members away from each other, by abutting contact of the first support member and the abutting part with each other through the first buffer member. Also disclosed is a method of producing the present elastic mount.

11 Claims, 3 Drawing Sheets

ELASTIC MOUNT HAVING MOUNTING BRACKET FUNCTIONING AS STOP MECHANISM AND METHOD OF PRODUCING THE SAME

BACKGROUND OF THE INVENTION

1. Field of the Invention

The present invention relates generally to an elastic mount such as an engine mount, a cab mount, a body mount and a member mount, suitably used for a motor vehicle, and a method of producing the same. More particularly, the present invention is concerned with such an elastic mount having a stop mechanism and a mounting bracket, and a method of producing the same.

2. Discussion of the Related Art

As one type of a vibration damping device interposed between two members of a vibration system for flexibly connecting the two members, there is known an elastic mount wherein a first and a second support member are spaced apart from each other by a suitable distance and are elastically connected with each other by an elastic body which is interposed therebetween. Such an elastic mount is suitably used as an engine mount for a motor vehicle, for example.

In the elastic mount as described above, it is generally required to provide a stop mechanism for limiting or restricting the amount of relative displacement of the first and second support members in a load-receiving direction in which a load is received by the elastic mount. This stop mechanism is provided for the purpose of limiting the amount of deformation of the elastic body and the amount of relative displacement of the two members in the vibration system, upon application of an excessive vibrational load to the elastic mount.

For facilitating the assembling of the elastic mount and permitting installation of the elastic mount on different types of vehicles, the elastic mount having such a stop mechanism usually uses a mounting bracket fixed to the second support member, so that the second support member is attached to one of the two members of the vibration system through the mounting bracket.

U.S. Pat. No. 5,183,243 and laid-open Publication No. 4-39446 of Japanese Utility Model application disclose examples of the elastic mount having the mounting bracket fixed to the second support member. Described in detail, the mounting bracket is a generally cylindrical member or a generally cylindrical member closed at one axial end thereof, which includes a leg portion provided on its outer circumferential surface. This mounting bracket is fitted on the second support member, so that the bracket is fixed by calking at its axial open end (i.e., calking portion) to the second support member and positioned relative to the second support member in the axial direction. The elastic mount disclosed in the publications further has a stop member which is made of metal separately from the bracket. Described in detail, the stop member is assembled on the side of the first support member, and is fixed by calking to the calking portion of the bracket to which the second support member is fixed. Alternatively, the stop member is fixed by welding to the second support member. According to this arrangement, the stop member extends from the second support member toward the first support member in the axial direction of these two members, so as to provide a stop portion which is spaced apart from the first support member in the axial direction away from the second support member, such that the stop portion is opposed to the first support member with a suitable axial distance therebetween.

In the elastic mount constructed as described above, the mounting bracket and stop member which are prepared as separate members must be assembled in different steps on the mount body consisting of the first and second support members and the elastic body elastically connecting these support members. This arrangement undesirably leads to increased numbers of required parts of the elastic mount and process steps in manufacturing the elastic mount, thereby lowering the production efficiency of the elastic mount and increasing the cost of manufacture of the elastic mount.

When the first support member is brought into abutting contact with the stop portion of the stop mechanism due to an excessive vibrational load applied to the elastic mount, the load acts directly on the calking portion of the mounting bracket, and tends to deteriorate the durability of the calking portion, resulting in a possibility of rattling movements and noise at the calking portion.

SUMMARY OF THE INVENTION

It is therefore a first object of the present invention to provide a structurally improved elastic mount, in which the stop mechanism and the mounting bracket are provided by a reduced number of parts so as to have a simple structure, and in which the stop mechanism has an increased resistance to the vibrational load and excellent durability with reduced drawbacks as encountered in the prior art.

It is a second object of the present invention to provide a method of producing such an elastic mount.

The above-indicated first object may be attained according to a first aspect of the present invention, which provides an elastic mount comprising: (a) a first and a second support member which are spaced apart from each other and elastically connected to each other by an elastic body; (b) the second support member having a cylindrical fixing portion having a larger diameter than the first support member; (c) a cylindrical bracket member press-fitted on an outer circumferential surface of the cylindrical fixing portion of the second support member such that the cylindrical bracket member encloses the first support member; (c) the bracket member including an axial end portion provided with an integrally formed abutting part which is spaced apart from the first support member in an axial direction of the bracket member from the second support member toward the first support member, the abutting part being opposed to the first support member in the axial direction; and (d) a first buffer member interposed between the first support member and the abutting part of the bracket member, the first support member, the abutting part and the first buffer member cooperating to constitute a first stop mechanism for limiting an amount of relative displacement of the first and second support members away from each other, by abutting contact of the first support member and the abutting part with each other through the first buffer member.

In the elastic mount of the present invention constructed as described above, the cylindrical bracket member is press-fitted on the cylindrical fixing portion of the second support member such that the bracket member encloses the first support member. In this arrangement, the abutting part integrally formed at the axial end portion of the bracket member can be positioned relative to the first support member such that the abutting part is spaced apart from the first support member in the axial direction from the second support member toward the first support member. Namely, the abutting part is located outwardly of the first support member in the axial direction of the bracket member, and is opposed to the first support member in the axial direction.

The abutting part may be a flange which extends radially inwardly from the axial end of the cylindrical bracket member.

Thus, the present elastic mount does not require an exclusive stopper member separate from the bracket member, whereby the number of the components of the elastic mount is accordingly reduced, leading to reduction in the number of process steps in the manufacture, and consequent increase in the manufacturing efficiency and reduction in the manufacturing cost.

In the present elastic mount, the load acting on the stop mechanism upon abutting contact of the first support member and the abutting part of the bracket member is transmitted through the bracket member to a member to which the second support member is fixed. In other words, no calking portion as provided in the prior art is present in the path of transmission of the load from the stop mechanism to the above-indicated member to which the second support member is fixed. Accordingly, the present elastic mount which has the mounting bracket and the stop mechanism exhibits an increased resistance to the input vibrational load and significantly improved durability.

The present invention is applicable to not only a solid-type or non-fluid-filled elastic mount which relies solely on the elasticity of the elastic body to exhibit a damping effect, but also a fluid-filled elastic mount which exhibits a damping effect based on flows or resonance of a non-compressible fluid.

The fluid-filled elastic mount may be constructed according to one preferred form of this invention, wherein the second support member is a generally cup-shaped member which includes an end portion having an open end fluid-tightly closed by the elastic body, and the second support member and the elastic body cooperate to define a fluid chamber filled with a non-compressible fluid which is forced to flow through the fluid chamber upon application of a vibrational load between the first and second support members.

In one advantageous arrangement of the above preferred form of the invention, the elastic mount further comprises an intermediate sleeve bonded to an outer circumferential surface of the elastic body, and the end portion of the second support member is fluid-tightly fixed to an outer circumferential surface of the intermediate sleeve and functions as the cylindrical fixing portion on which the bracket member is press-fitted. The intermediate sleeve is preferably formed of a metal. For improved fluid tightness between the intermediate sleeve and the fixing portion of the second support member, a suitable sealing rubber layer is advantageously interposed between the intermediate sleeve and the fixing portion of the second support member. Although the cylindrical fixing portion of the second support member may be calked at its open end against the intermediate sleeve, the fixing portion is desirably press-fitted on the outer circumferential surface of the intermediate sleeve by merely drawing the fixing portion against the intermediate sleeve, since the load acting on the stop mechanism is not transmitted to the connection between the intermediate sleeve and the second support member.

According to another preferred form of this invention, the elastic mount further comprises a second buffer member provided on an outer surface of the abutting part of the bracket member which outer surface faces in the axial direction and which is spaced apart from and opposed to one of two members in the axial direction, when the elastic mount is installed for connecting the two members in a vibration damping manner such that the first support member is fixed to the one of the two members while the second support member is fixed to the other of the two members. In this instance, the second buffer member cooperates with the abutting part to constitute a second stop mechanism for limiting an amount of relative displacement of the first and second support members toward each other, by abutting contact of the abutting part and the one of the two members with each other through the second buffer member.

The elastic mount according to the above preferred form of the invention does not require an exclusive stopper member, to provide the second stop mechanism for limiting the amount of relative displacement of the first and second support members toward each other, in addition to the first stop mechanism. Thus, the elastic mount provided with the two stop mechanisms for preventing excessive displacements of the first and second support members in the rebound and bound directions can be obtained with a simple structure.

According to a further preferred form of this invention, the bracket member includes a large-diameter portion press-fitted on the outer circumferential surface of the cylindrical fixing portion of the second support member, a small-diameter portion which has a smaller diameter than the large-diameter portion and which has the axial end portion provided with the abutting part, and a shoulder portion between the large-diameter and small-diameter portions. The shoulder portion is held in contact with one of opposite axial ends of the cylindrical fixing portion of the second support member, whereby the bracket member is positioned relative to the second support member in the axial direction.

According to a still further preferred form of the invention, the elastic body is elastically compressed by a displacement of the first and second support members toward each other in the axial direction by a static load applied between the first and second support members. In this case, the first stop mechanism operates as a rebound stopper to limit the amount of relative displacement of the first and second support members in the rebound direction. However, the elastic mount may be adapted such that the elastic body is elastically compressed by a displacement of the first and second support members away from each other in the axial direction by a static load applied therebetween. In this case, the first stop mechanism operates as a bound stopper to limit the amount of relative displacement of the first and second support members in the bound direction.

According to a yet further preferred form of this invention, the bracket member is provided with a leg portion extending radially outwardly from an outer circumferential surface thereof, so that the second support member is fixed to one of two members of a vibration system through the leg portion when the elastic mount is installed such that the first support member is fixed to the other of the two members while the first support member is fixed to the one of the two members. In this arrangement, the leg portion of the bracket member is firmly bolted or otherwise secured to the above-indicated one of the two members of the vibration system, so that the load acting on the stop mechanism is received by the above-indicated one member of the vibration system through the leg portion.

According to another preferred form of the invention, the elastic body and the second support member cooperate to define a fluid chamber filled with a non-compressible fluid, and the elastic mount further comprises a flexible member provided in the fluid chamber so as to divide the fluid chamber into a pressure-receiving chamber partially defined by the elastic body, and an equilibrium chamber partially defined by the second support member. In this elastic mount, the pressure-receiving and equilibrium chambers communicate with each other through an orifice passage so that the fluid is forced to flow through the orifice passage upon application of a vibrational load between the first and second support members.

The first support member may include a stop portion which is spaced apart from and opposed to the abutting part of the bracket member in the axial direction.

The second object indicated above may be achieved according to a second aspect of the present invention, which provides a method of producing an elastic mount wherein a first and a second support member are spaced apart from each other and elastically connected to each other by an elastic body, the method comprising the steps of: (i) preparing a mount body including the first and second support members and the elastic body such that the second support member has a cylindrical fixing portion having a larger diameter than the first support member; (ii) preparing a cylindrical bracket member including an axial end portion provided with an abutting part formed integrally with the axial end portion such that the abutting part extends radially inwardly of the cylindrical bracket member; and (iii) press-fitting the cylindrical bracket member on an outer circumferential surface of the cylindrical fixing portion of the second support member of the mount body, such that the bracket member encloses the first support member, such that the abutting part is spaced apart from the first support member in an axial direction of the bracket member from the second support member toward the first support member, and such that the abutting part is opposed to the first support member in the axial direction, the first support member and the abutting part cooperating to constitute a stop mechanism for limiting an amount of relative displacement of the first and second support members away from each other, by abutting contact of the first support member and the abutting part with each other.

According to the present method, the cylindrical bracket member is press-fitted on the cylindrical fixing portion of the second support member of the mount body, such that the abutting part of the bracket member is opposed to the first support member in the axial direction so as to provide the first stop mechanism. The present method permits efficient and economical manufacture of the elastic mount equipped with the bracket member and the stop mechanism, without attaching any exclusive member to the mount body for providing the stop mechanism, and without calking the bracket member against the second support member, for example.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
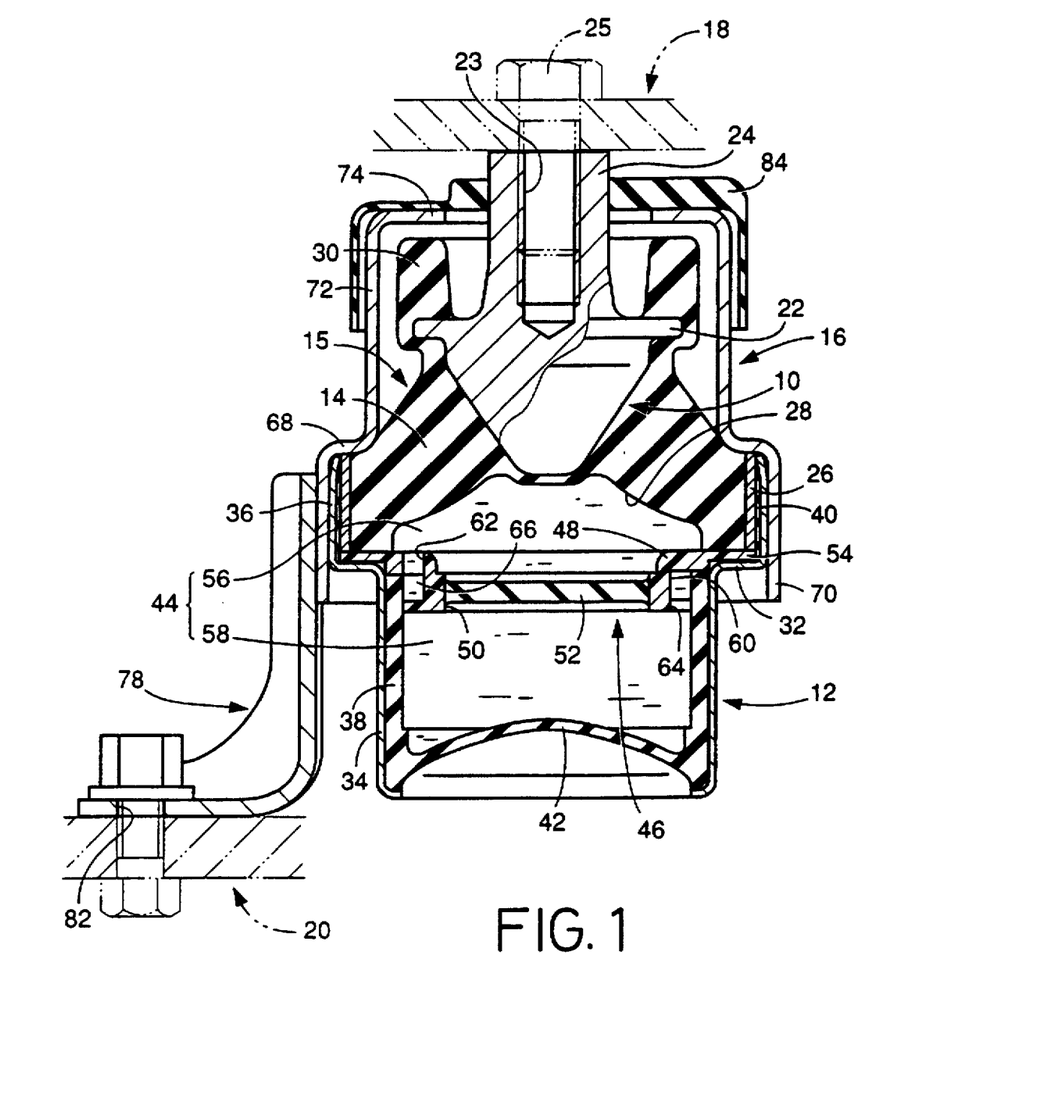
FIG. 1 is an elevational view in longitudinal cross section of an engine mount constructed according to one embodiment of the present invention.
Figure 2:
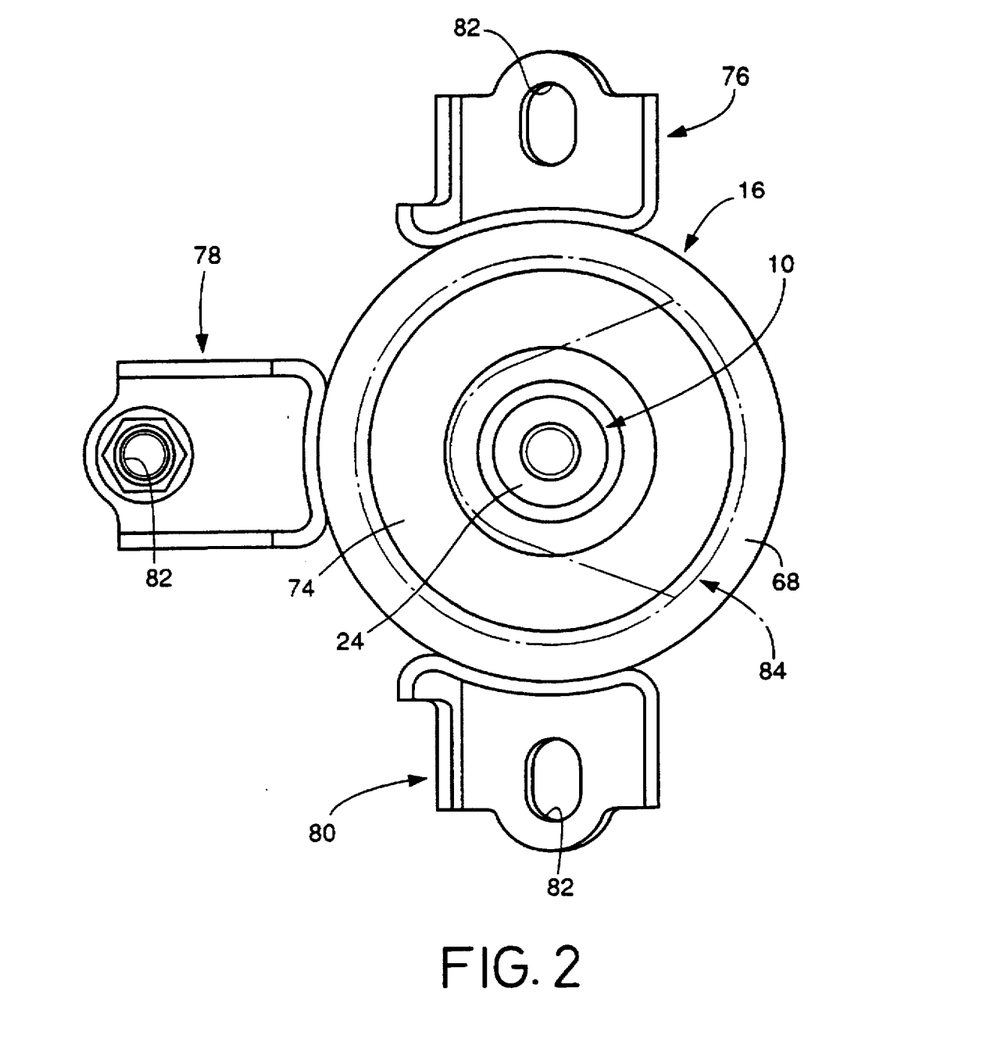
FIG. 2 is a plan view of the engine mount of FIG. 1.

Referring first to FIGS. 1 and 2, there is shown one embodiment of an elastic mount in the form of a fluid-filled engine mount for use on a motor vehicle. The engine mount consists of a mount body 15 and a bracket member 16 attached to the mount body 15. The mount body 15 includes a first support member 10 and a second support member 12 which are made of a metallic material and are spaced apart from each other by a suitable distance in a vertical direction as seen in FIG. 1. These first and second support members 10, 12 are elastically connected by an elastic body 14 interposed therebetween. As indicated by two-dot chain lines in FIG. 1, this engine mount is interposed between a power unit 18 and a body 20 of the vehicle such that the first support member 10 is fixed to the power unit 18 by means of a bolt 25, while the second support member 12 is attached to the vehicle body 20 through legs 76, 78, 80 (FIG. 2) of the bracket member 16. In FIG. 1, only the leg 78 is shown. Thus, the power unit 18 is mounted on the vehicle body 20 via the present engine mount in a vibration damping or isolating manner. When the present engine mount is installed on the vehicle as described above, a load or weight of the power unit 18 acts on the engine mount in the vertical direction as seen in FIG. 1. The engine mount receives a vibrational load primarily in the vertical direction in which the first and second support members are opposed to and spaced apart from each other. This direction will be referred to as "load-receiving direction" where appropriate.

The first support member 10 of the mount body 15 has a generally inverted frustoconical shape. The first support member 10 includes an annular stop portion 22 formed integrally at its large-diameter end portion. The stop portion 22 protrudes radially outwardly of the large-diameter end portion of the first support member 10 by a suitable radial distance. The first support member 10 further includes a rod portion 24, which extends axially upwardly (outwardly) from a radially central portion of the large-diameter end face of the first support member 10 as seen in FIG. 1. The rod portion 24 has a threaded hole 23 extending from its upper end face toward the large-diameter end portion of the first support member 10. As indicated by the two-dot chain lines in FIG. 1, the first support member 10 is fixed to the power unit 18 by the bolt 25 screwed in the threaded hole 23 such that the upper end face of the rod portion 24 is in contact with the underside of the power unit 18.

The elastic body 14 assumes a generally truncated conical shape and has a cavity 28 open in its large-diameter end portion. The first support member 10 is bonded to the small-diameter end of the elastic body 14 in the process of vulcanization of a rubber material of the elastic body 14. A cylindrical intermediate sleeve 26 made of a metallic material is bonded to the outer circumferential surface of the large-diameter end portion of the elastic body 14 also in the vulcanization process. The intermediate sleeve 26 has a diameter larger than that of the first support member 10, and has the same diameter as the large-diameter end portion of the elastic body 14, which has the largest diameter of the elastic body 14. In other words, the outer circumference of the intermediate sleeve 26 has the largest diameter of an intermediate product consisting of the first mounting sleeve 10, elastic body 14 and intermediate sleeve 26.

On the upper surface of the stop portion 22 of the first support member 10 which is on the side of the rod portion 24, there is formed a first buffer member in the form of a first rubber buffer 30 which extends over the entire circumference of the stop portion 22 and protrudes axially upwardly or outwardly of the stop portion 22 as seen in FIG. 1. In the present embodiment, the first rubber buffer 30 is formed integrally with the elastic body 14.

The second support member 12 of the mount body 15 has a generally cylindrical shape having a shoulder 32 formed at an axially intermediate portion thereof. The second support member 12 includes a small-diameter portion 34 and a large-diameter portion 36 on the opposite sides of the shoulder 32. The inner circumferential surfaces of the small-diameter and large-diameter portions 34, 36 are substantially entirely covered by sealing rubber layers 38, 40, respectively. The lower open end of the second support member 12 on the side of the small-diameter portion 34 is fluid-tightly closed by a diaphragm 42, which is a relatively thin-walled, flexible, rubber layer.

The second support member 12 is fixed to the intermediate product (consisting of the first support member 10, elastic body 14 and intermediate sleeve 26), such that the large-diameter portion 36 of the second support member 12 is fitted on the intermediate sleeve 26 which is bonded to the elastic body 14. The large-diameter portion 36 is subjected to a suitable drawing operation, so that the large-diameter portion 36 is fixedly secured to the outer circumferential surface of the intermediate sleeve 26 via the sealing rubber layer 40. In the thus constructed engine mount, the upper open end of the second support member 12 on the side of the large-diameter portion 36 is fluid-tightly closed by the elastic body 14, such that the second support member 12 and the elastic body 14 cooperate to define a fluid chamber 44 filled with a suitable non-compressible fluid. The filling of the non-compressible fluid may be advantageously effected by mounting the second support member 12 on the intermediate sleeve 26, within a mass of the non-compressible fluid. The above-described sealing layer 40 is sandwiched by and between the outer circumferential surface of the intermediate sleeve 26 and the inner circumferential surface of the large-diameter portion 36 of the second support member 12, so as to assure fluid-tightness therebetween.

Within the fluid chamber 44, there is disposed a partition member 46 which is a generally circular disc. The partition member 46 includes an annular support plate 48 which is made of a relatively hard material such as a fiber-reinforced resin or metal and has a central hole 50 formed through its thickness. The partition member 46 further has a flexible, circular, rubber film 52 which is bonded by vulcanization to the inner surface of the central hole 50, so as to fluid-tightly close the central hole 50. The support plate 48 has a radially outer peripheral portion 54 which is gripped by and between the shoulder 32 of the second support member 12 and the lower axial end of the intermediate sleeve 26, whereby the partition member 46 is fixedly attached to the second support member 12. The partition member 46 divides the fluid chamber 44 into two sections on the axially opposite sides thereof, namely, a pressure-receiving chamber 56 partially defined by the elastic body 14 and an equilibrium chamber 58 partially defined by the diaphragm 42. Upon application of a vibrational load to the engine mount, the pressure of the fluid in the pressure-receiving chamber 56 varies due to the elastic deformation of the elastic body 14, while the volume of the equilibrium chamber 58 is permitted to vary by displacement of the diaphragm 42.

The support plate 48 of the partition member 46 is formed with a circumferential groove 60 open in its outer circumferential surface. The circumferential groove 60 is closed by the second support member 12, so as to define an orifice passage 60 which extends over a suitable circumferential length. The orifice passage 60 communicates at one end thereof with the pressure-chamber 56 through a communication hole 62 and at the other end with the equilibrium chamber 58 through a communication hole 64.

In the thus constructed mount body 15, the non-compressible fluid is forced to flow between the pressure-receiving and equilibrium chambers 56, 58 through the orifice passage 66 due to a pressure difference between the two chambers 56, 58 upon application of a vibrational load between the first and second support members 10, 12. Accordingly, the engine mount including the mount body 15 is capable of exhibiting a desired damping effect based on resonance of the fluid flowing through the orifice passage 66. In the present embodiment, the cross sectional area and length of the orifice passage 66 are tuned or determined to exhibit a high damping effect with respect to low-frequency vibrations such as engine shakes based on resonance of the fluid flowing through the orifice passage 66. This tuning of the orifice passage 66 is effected while taking account of stiffness of the wall of the elastic body 14 which partially defines the pressure-receiving chamber 56. When the input vibration is in a frequency range higher than the frequency range to which the orifice passage 66 is tuned, the flow resistance of the orifice passage 66 is too high to damp such input vibration. In the present embodiment, however, the flexible rubber film 52 closing the central hole 50 of the support plate 48 is capable of absorbing a small pressure change in the pressure-receiving chamber 56 by the elastic deformation thereof, whereby the engine mount exhibits a high damping effect with respect to the medium- and high-frequency vibrations such as engine idling vibration.

Figure 3:
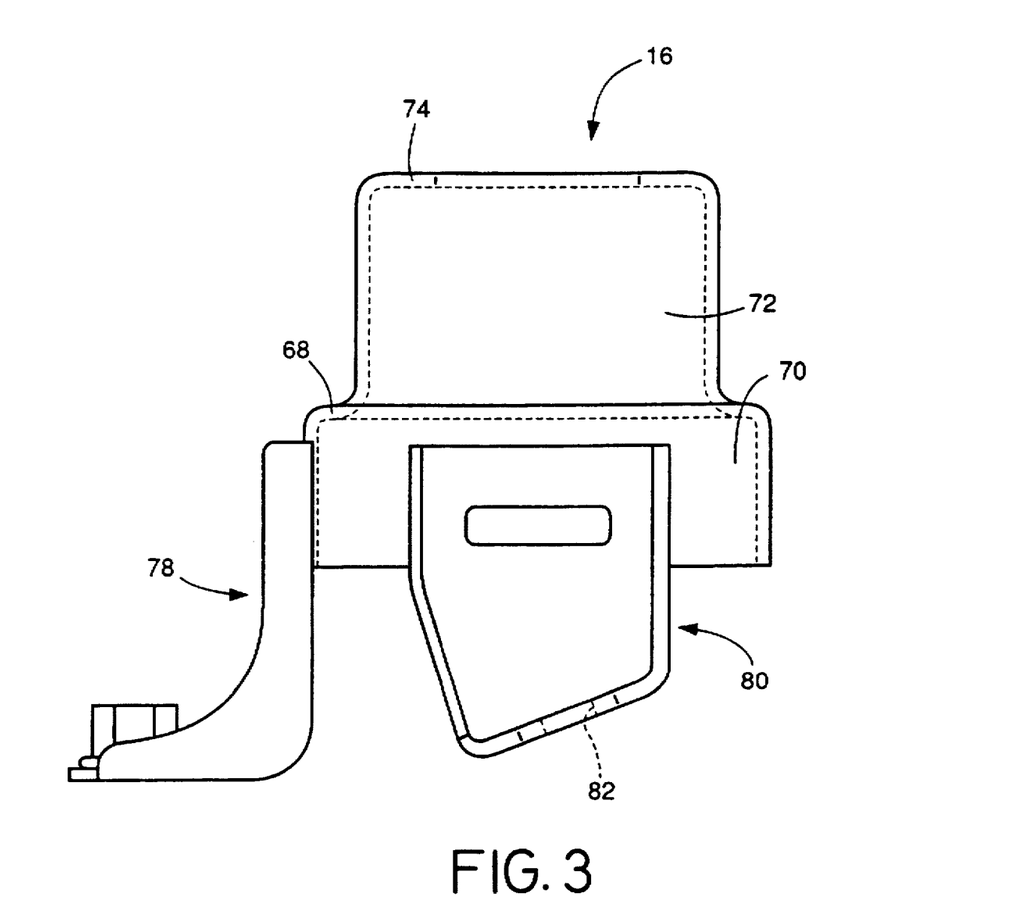
FIG. 3 is a front elevational view of a mounting bracket member used in the engine mount of FIG. 1.

As shown in FIG. 3, the bracket member 16 which is attached to the mount body 15 constructed as described above is made of a rigid material such as steel and has a generally cylindrical shape. Described more specifically, the bracket member 16 has a shoulder 68 at an axially intermediate portion thereof, and includes a large-diameter portion 70 and a small-diameter portion 72 formed on the opposite sides of the shoulder 68, respectively. The small-diameter portion 72 is bent radially inwards at its upper open end (as seen in FIG. 3), so as to provide an annular abutting part 74 which protrudes radially inwards by a suitable radial length. To the outer circumferential surface of the large-diameter portion 70, there are fixed by welding the above-indicated legs 76, 78, 80, each of which extends downward from the large-diameter portion 70, as seen in FIG. 3. The periphery of each of the legs 76, 78, 80 is ribbed. Each leg portion 76, 78, 80 has, at its foot portion a bolt hole 82 through which a bolt is inserted for fixing the engine mount (15, 16) to the vehicle body 20.

For fixing the bracket member 16 on the mount body 15 to provide the engine mount, the bracket member 16 is positioned with its large-diameter portion 70 located on the side of the first support member 10, and is axially moved so as to enclose the first support member 10 and press-fit the large-diameter portion 70 on the large-diameter portion 36 of the second support member 12. The bracket member 16 is positioned relative to the second support member 12 in the axial direction, such that the shoulder 68 of the bracket member 16 is in contact with the upper axial ends of the intermediate sleeve 26 and the large-diameter portion 36 of the second support member 12. The large-diameter portion 70 of the bracket member 16 has an axial length sufficiently larger than that of the large-diameter portion 36 of the second support member 12, so that the large-diameter portion 70 press-fitted on the large-diameter portion 36 extends over the entire axial length of the large-diameter portion 36. The large-diameter portion 36 of the second support member 12 functions as a fixing portion at which the bracket member 16 is fixed to the second support member 12.

With the bracket member 16 assembled with the mount body 15 as described above, the small-diameter portion 72 of the bracket member 16 extends from the second support member 12 toward the first support member 10 in the axially upward direction as seen in FIG. 1, so as to surround an upper part of the elastic body 14. In this arrangement, the abutting part 74 of the bracket member 16 is spaced apart from the stop portion 22 of the first support member 10 by a suitable axial distance in the axial direction away from the stop portion 22 toward the power unit 18, namely, in an axial direction of the bracket member 16 from the second support member 12 toward the first support member 10. The stop portion 22 and the abutting part 74 are opposed to each other in the axial direction. When the first support member 10 is displaced in the axial direction away from the second support member 12 upon application of a vibrational load to the thus constructed engine mount, the stop portion 22 is brought into an abutting contact with the abutting part 74 of the bracket member 16 via the first rubber buffer 30 formed on the upper surface of the stop portion 22. Thus, the stop portion 22 of the first support member 10, the abutting part 74 of the bracket member 16 and the first rubber block 30 cooperate to constitute a first stop mechanism (rebound stopper) for limiting the amount of relative displacement of the first and second support members 10, 12 in the axial direction away from each other, i.e., in the rebound direction. In the engine mount constructed as described above, the rod portion 24 of the first support member 10 protrudes axially upwardly or outwardly from the open end of the small-diameter portion 72 of the bracket member 16 by a suitable axial distance, so that the power unit 18 is bolted to the rod portion 24 of the first support member 10.

In the engine mount having the first stop mechanism 22, 30, 74 as described above, the load acting on the first stop mechanism upon abutting contact of the stop part 22 with the abutting part 74 via the first rubber buffer 30 for limiting the relative displacement amount of the first and second members 10, 12 in the rebound direction is transmitted to and received by the vehicle body 20 via the bracket member 16, without adversely affecting the connection of the bracket member 16, second support member 12 and intermediate sleeve 26. In this respect, it is noted that no calking portion is present in a transmission path of the load between the first stop mechanism and the vehicle body 20. Accordingly, the engine mount of the present embodiment is capable of exhibiting high degrees of load resistance and durability, owing to a sufficient mechanical strength of the bracket member 16 and the first support member 10.

The abutting part 74 of the bracket member 16 is opposed at its upper surface (as seen in FIG. 1) to the power unit 18 to which the first support member 10 is fixed through the rod portion 24. Namely, the abutting part 74 is opposed to the power unit 18 in the load-receiving direction of the engine mount with a suitable axial distance therebetween. On the outer surfaces of the abutting part 74 and the small-diameter portion 72 of the bracket member 16, there is formed a second buffer member in the form of an inverted cup-shaped rubber buffer 84, so as to cover the annular abutting part 74. When the first support member 10 is displaced in the axial direction toward the second support member 12 upon application of a vibrational load to the engine mount, the abutting part 74 of the bracket member 16 is brought into abutting contact with the power unit 18 via the second rubber buffer 84. Thus, the abutting part 74 and the second rubber buffer 84 cooperate to constitute a second stop mechanism (bound stopper) for limiting the amount of relative displacement of the first and second support members 10, 12 in the axial direction toward each other, i.e., in the bound direction.

In the above second stop mechanism, too, the load acting on the second stop mechanism upon abutting contact of the abutting part 74 with the power unit 18 via the second rubber buffer 84 for limiting the relative displacement amount of the first and second members 10, 12 in the bound direction is transmitted to and received by the vehicle body 20 through the bracket member 16, without adversely affecting the connection of the bracket member 16, second support member 12 and intermediate sleeve 26. In this respect, it is noted that no calking portion is present in a transmission path of the load between the second stop mechanism and the vehicle body 20. Accordingly, the engine mount of the present embodiment is capable of exhibiting high degrees of load resistance and durability upon abutting contact of the abutting part 74 with the power unit 18, owing to a sufficient mechanical strength of the bracket member 16 and the first support member 10.

In the manufacture of the present engine mount constructed as described above, the bracket member 16 is attached to the mount body 15, without any cumbersome process such as calking. Further, the abutting part 74 formed integrally with the bracket member 16 selectively functions as the first or second stop mechanism for limiting the relative displacement amount of the first and second support members 10, 12 in the rebound or bound direction. Thus, the present engine mount having the stop mechanisms and the bracket member as described above is constituted by a relatively small number of components, which assures improved manufacturing efficiency of the engine mount.

In the present engine mount, the load generated by abutting contact of the abutting part 74 with the stop portion 22 or power unit 18 acts on the vehicle body 20 through the highly rigid bracket member 16, without adversely affecting the connection of the bracket member 16, second support member 12 and intermediate sleeve 26. Accordingly, the present engine mount exhibits a high degree of resistance to the input load, while assuring excellent durability.

In the present embodiment, the large-diameter portion 70 of the bracket member 16 is press-fitted on the large-diameter portion 36 of the second support member 12, whereby the bracket member 16 and the second support member 12 are secured to each each other. An experiment conducted by the inventors of the present invention revealed the second support member 12 is prevented from slipping off away from the bracket member 16 in the downward direction (as seen in FIG. 1) without any special bonding or fixing means provided at the connection of the bracket member 16 and the second support member 12, owing to a relatively large area of pressing contact between the large-diameter portion 70 of the bracket member 16 and the large-diameter portion 36 of the second support member 12 which has a diameter of 50 mm and an axial length of 10 mm. An experiment conducted by the present inventors revealed that the press-fitting between the bracket member 16 and the second support member 12 is able to withstand a load of 1.5 t or higher acting on the engine mount in the downward direction as seen in FIG. 1. Thus, the present engine mount is able to sufficiently withstand a load of 0.6 t, which is an average load capacity of engine mounts commonly known in the art. Upon application of the vibrational load to the present engine mount in the rebound direction, the first stop mechanism constituted by the stop portion 22 of the first support member 10, abutting part 74 of the bracket member 16 and first rubber buffer 30 prevents an excessive amount of displacement of the first support member 10 in the axial direction away from the second support member 12, to thereby protect the press-fitting connection between the large-diameter portion 36 of the second support member 12 and the large-diameter portion 70 of the bracket member 16.

Accordingly, the present engine mount is capable of exhibiting a considerably high degree of resistance to the vibrational load applied thereto.

While the present invention has been described above in its presently preferred embodiment, it is to be understood that the invention is not limited to the details of the illustrated embodiment, but may be otherwise embodied.

For instance, the engine mount need not have the second stop mechanism wherein the abutting part 74 of the bracket member 16 is opposed to the power unit 18.

In the illustrated embodiment, the bracket member 16 has the abutting part 74 having an annular shape and formed over the entire circumference of the small-diameter portion 72 at the upper open end thereof. However, the abutting part may have an arcuate shape or consist of a plurality of abutting portions arranged along the circumference of the bracket member 16.

The configuration of the legs 76, 78, 80 fixed to the bracket member 16 may be suitably changed depending upon the configuration of a portion of the vehicle body 20 to which each leg portion is secured. The legs may be eliminated where the engine mount is installed on the vehicle such that the bracket member is press-fitted in a mounting hole formed in a selected member of the vehicle.

While the elastic mount according to the illustrated embodiment of the present invention is a fluid-filled engine mount having the fluid chamber 44, the principle of the invention is equally applicable to a solid-type or non-fluid-filled elastic mount without the fluid chamber. In such a solid-type elastic mount, the first and second support members may be bonded directly to the elastic body in the process of vulcanization of a rubber material of the elastic body.

The illustrated engine mount is adapted to flexibly mount the power unit 18 on the vehicle body 20 such that the first and second support members 10, 12 are displaced toward each other by the weight of the power unit 18, namely, by the static load. However, the elastic mount of the present invention may be adapted to flexibly suspend the power unit from the vehicle body such that the first and second support members 10, 12 are displaced away from each other by the static load.

While the illustrated embodiment of the elastic mount takes the form of the engine mount for a motor vehicle, the principle of the present invention is equally applicable to various other types of elastic mounts such as a cab mount, a body mount and a member mount for use on a motor vehicle, and elastic mounts used for various devices other than those for the motor vehicle.

It is to be understood that the present invention may be embodied with various changes, modifications and improvements, which may occur to those skilled in the art without departing from the spirit and scope of the invention defined in the following claims.

What is claimed is:

1. An elastic mount comprising:
   a first support member and a second support member which are spaced apart from each other and elastically connected to each other by an elastic body;
   said second support member having a cylindrical fixing portion with a larger diameter than said first support member;
   a cylindrical bracket member press-fitted on an outer circumferential surface of said cylindrical fixing portion of said second, support member such that said cylindrical bracket member encloses said first support member;
   said cylindrical bracket member including a large-diameter portion press-fitted on said outer circumferential surface of said cylindrical fixing portion of said second support member, and a small-diameter portion which has a smaller diameter than said large-diameter portion and which has an axial end portion provided with an integrally formed abutting part,
   said abutting part being spaced apart from said first support member in an axial direction of said bracket member from said second support member toward said first support member and opposed to said first support member in said axial direction,
   said bracket member further including a shoulder portion between said large-diameter and small-diameter portions, said shoulder portion being held in contact with one of opposite axial ends of said cylindrical fixing portion of said second support member, whereby said bracket member is positioned relative to said second support member in said axial direction; and
   a first buffer member interposed between said first support member and said abutting part of said bracket member;
   said first support member, said abutting part and said first buffer member cooperating to constitute a first stop mechanism for limiting an amount of relative displacement of said first and second support members away from each other, by abutting contact of said first support member and said abutting part with each other through said first buffer member.

2. An elastic mount according to claim 1, wherein said second support member is a generally cup-shaped member which includes an end portion having an open end fluid-tightly closed by said elastic body, said second support member and said elastic body cooperating to define a fluid chamber filled with a non-compressible fluid which is forced to flow through said fluid chamber upon application of a vibrational load between said first and second support members.

3. An elastic mount according to claim 2, further comprising an intermediate sleeve bonded to an outer circumferential surface of said elastic body, and wherein said end portion of said second support member is fluid-tightly fixed to an outer circumferential surface of said intermediate sleeve and functions as said cylindrical fixing portion on which said bracket member is press-fitted.

4. An elastic mount according to claim 1, further comprising a second buffer member provided on an outer surface of said abutting part of said bracket member which outer surface faces in said axial direction and which is spaced apart from and opposed to one of two members in said axial direction, when said elastic mount is installed for connecting said two members in a vibration damping manner such that said first support member is fixed to said one of said two members while said second support member is fixed to the other of said two members, said second buffer member cooperating with said abutting part to constitute a second stop mechanism for limiting an amount of relative displacement of said first and second support members toward each other, by abutting contact of said abutting part and said one of said two members with each other through said second buffer member.

5. An elastic mount according to claim 1, wherein said elastic body is elastically compressed by a displacement of said first and second support members toward each other by a static load applied between said first and second support members.

6. An elastic mount according to claim 1 wherein said bracket member is provided with a leg portion extending radially outwardly from an outer circumferential surface thereof, said second support member being fixed to one of two members through said leg portion when said elastic mount is installed such that said first support member is fixed to the other of said two members while said first support member is fixed to said one of said two members.

7. An elastic mount according to claim 1 wherein said elastic body and said second support member cooperate to define a fluid chamber filled with a non-compressible fluid, said elastic mount further comprising a flexible member provided in said fluid chamber so as to divide said fluid chamber into a pressure-receiving chamber partially defined by said elastic body, and an equilibrium chamber partially defined by said second support member, said pressure-receiving and equilibrium chambers communicating with each other through an orifice passage so that said fluid is forced to flow through said orifice passage upon application of a vibrational load between said first and second support members.

8. An elastic mount according to claim 1, wherein said first support member includes a stop portion which is spaced apart from and opposed to said abutting part of said bracket member in said axial direction.

9. A method of producing an elastic mount wherein a first support member and a second support member are spaced apart from each other and elastically connected to each other by an elastic body, said method comprising the steps of:

preparing a mount body including said first and second support members and said elastic body such that said second support member has a cylindrical fixing portion having a larger diameter than said first support member;

preparing a cylindrical bracket member including a large-diameter portion which is press-fitted on an outer circumferential surface of said cylindrical fixing portion of said second support member, and a small-diameter portion which has a smaller diameter than said large-diameter portion and which has an axial end portion provided with an abutting part formed integrally with said axial end portion such that said abutting part extends radially inwardly of said cylindrical bracket member;

said bracket member further including a shoulder portion between said large-diameter and small-diameter portions, said shoulder portion being held in contact with one of opposite axial ends of said cylindrical fixing portion of said second support member, whereby said bracket member is positioned relative to said second support member in said axial direction; and press-fitting said cylindrical bracket member on said outer circumferential surface of said cylindrical fixing portion of said second support member of said mount body, such that said bracket member encloses said first support member such that said abutting part is spaced apart from said first support member in an axial direction of said bracket member from said second support member toward said first support member, and such that said abutting part is opposed to said first support member in said axial direction, said first support member and said abutting part cooperating to constitute a stop mechanism for limiting an amount of relative displacement of said first and second support members away from each other, by abutting contact of said first support member and said abutting part with each other.

10. A method according to claim 9, wherein said step of preparing a mount body comprises forming a first buffer member between said first support member and said abutting part of said bracket member.

11. A method according to claim 9, wherein said step of preparing a mount body comprises providing said cylindrical bracket member with a leg portion which extends radially outwardly from an outer circumferential surface of said bracket member, so that said second support member is fixed to one of two members through said leg portion when said elastic mount is installed such that said first support member is fixed to the other of said two members while said first support member is fixed to said one of said two members.

\* \* \* \* \*